June 9, 1953 R. H. PIERCE 2,641,649

WAVE SHAPING CIRCUIT

Filed June 26, 1951

INVENTOR
Robert H. Pierce
BY
ATTORNEY

Patented June 9, 1953 2,641,649

UNITED STATES PATENT OFFICE 2,641,649

WAVE SHAPING CIRCUIT

Robert H. Pierce, Palatine, Ill., assignor to Radio Corporation of America, a corporation of Delaware Application June 26, 1951, Serial No. 233,594

6 Claims. (Cl. 178—44)

This invention relates to electrical wave shaping circuits, and more particularly to wave shaping circuits designed to compress one part of a signal and to expand another part of that signal.

In the image reproducing arts, it is often necessary to reproduce an image of a scene by a medium having a smaller range of light values than the range of light values in the original scene. For example, in both black-and-white and color printing, the transparencies derived by the photographic process ordinarily have a ratio of maximum to minimum light transmission on the order of 200:1 whereas the paper on which the image is to be reproduced may have a corresponding ratio of only 20:1. A similar situation exists in television owing at least in part to the limitations of the reproducing kinescope used in receivers.

Unless remedial steps are taken, small variations in intensity of the original scene that take place at light levels beyond the range of the reproducing medium are lost. For example, if a person's face in the transparency or in an actual scene reflects more light than the reproducing means can handle, the face appears in the reproduced image as being pasty white. All the fine shadings representative of delicate facial contours are lost. If a neutral filter is employed to limit the maximum amount of light applied to the reproducing medium, fine shading in the dark portion of the scene may then be below the minimum light capacity of the reproducing means.

Accordingly, it has been suggested that the linearity of the reproducing system be altered so that all intensity variations, whether they are in a light portion of a scene or in a dark portion, may be reproduced in some degree. The nature of this non-linearity is normally such that a given change in light input to the reproducing system as it is derived from a dark area produces a greater change in output of the reproducing medium than a similar change in the light portions of the scene. Thus, light areas are compressed and the dark areas are expanded. This particular type of non-linearity is selected because the eye's response characteristics are such that small variations in the output of the reproducing medium in light areas appear to be comparable to larger changes in dark areas. The degree of non-linearity of the reproducing system is generally termed the "gamma" of the system and it may be defined as the power to which the light input must be raised to give the output. Thus, $L_o=KL_i^{\gamma}$ when $L_i$ is the light input, $L_o$ is the light output, $\gamma$ is the "gamma," and K is a constant.

One object of this invention is to provide a circuit to alter the linearity of a signal transmission path.

Another object of this invention is to provide a circuit that will compress one part of an input signal and expand another part of that signal.

According to the present invention there is provided a voltage divider circuit whose division ratio is dependent on the instantaneous polarity of an applied signal with respect to a reference potential.

Other and incidental objects of this invention will be apparent to those skilled in the art from a reading of the following specification and an inspection of the accompanying drawings in which.

Figure 1:
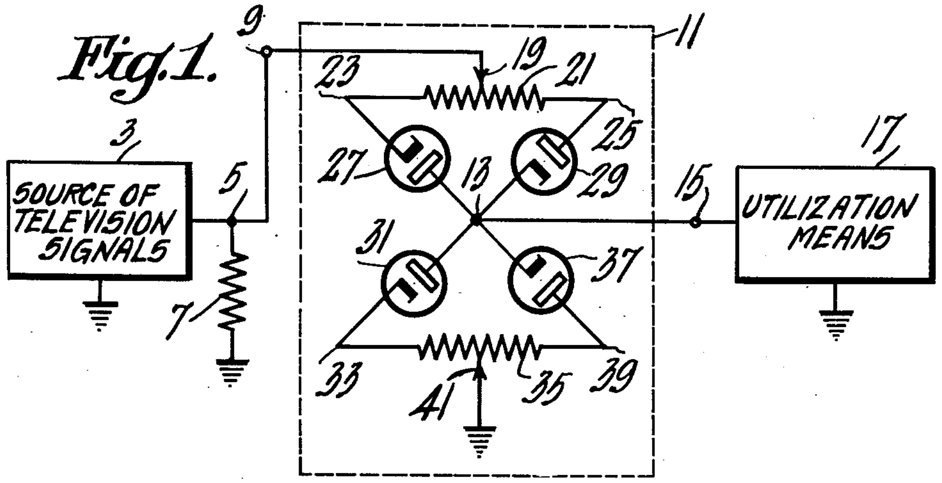
Fig. 1 shows a circuit according to the invention, with the controls of the circuit in a first position.

Referring now to Fig. 1 there is shown a source of television signals 3 having an output terminal 5. The output terminal 5 is connected to ground through a resistor 7. The output terminal 5 is also connected to the input terminal 9 of a gamma control network 11. The gamma control network 11 has an output terminal 13 which is connected to the input terminal 15 of a utilization means 17.

The input terminal 9 of the gamma control network is connected through a sliding contact 19 to a resistor 21. Resistor 21 has two terminals 23 and 25. A diode 27 has its cathode connected to terminal 23 and its anode connected to terminal 13. A diode 29 has its cathode connected to terminal 13 and its anode connected to terminal 25. A diode 31 has its anode connected to terminal 13 and its cathode connected to a first terminal 33 of a resistor 35. A diode 37 has its cathode connected to terminal 13 and its anode connected to a second terminal 39 of resistor 35. A sliding contact 41 is connected between resistor 35 and ground. The impedances of diodes 27, 29, 31, and 37 are equal, and the values of resistors 21 and 35 are also equal.

Figure 2:
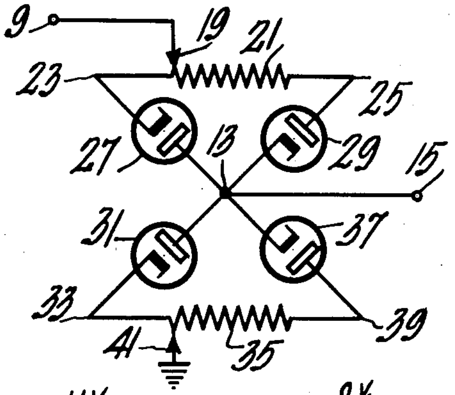
Fig. 2 shows the circuit of Fig. 1 with its controls in another position.

The operation of the gamma control network 11 will be explained by referring to Figs. 2, 3, and 4. Let us assume that the sliding contacts 19 and 41 are in the position shown in Fig. 2, and that an alternating signal is applied at terminal 9. When the signal is negative with respect to its reference axis, the path of the signal will be through diodes 27 and 37, and resistor 35 to ground. When the signal is positive with respect to its reference axis, the path of the signal will be through resistor 21, and diodes 29 and 31 to ground. Looking upon the gamma control network 11 as a voltage divider, it becomes apparent to those skilled in the art that the potential at the output terminal 13 will represent a percentage greater than 50% of a negative signal applied at terminal 9, and a percentage lower than 50% of a positive signal applied at terminal 9. The negative portions of an alternating signal applied at terminal 9 are thus expanded, while its positive portions are compressed. This result is shown by curve 43 of Fig. 4.

Figure 3:
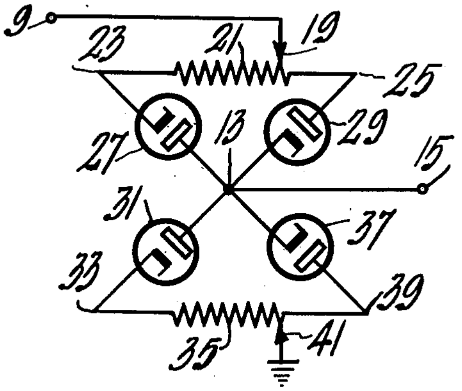
Fig. 3 shows the circuit of Fig. 1 with its controls in still another position.

Let us assume that the sliding contacts 19 and 41 are in the position shown in Fig. 3, and that an alternating signal is applied at terminal 9. When the signal is negative with respect to its reference axis, the path of the signal will be through resistor 21, and diodes 27 and 37 to ground. When the signal is positive with respect to the reference axis, the path to the signal will be through diodes 29 and 31, and resistor 35 to ground. Looking again upon the gamma control network 11 as a voltage divider, it becomes apparent to those skilled in the art that the potential at the output terminal 13 will represent a percentage greater than 50% of a positive signal applied at terminal 9, and a percentage lower than 50% of a negative signal applied at terminal 9. The positive portions of an alternating signal applied at terminal 9 are thus expanded, while the negative portions are compressed. This result is shown by curve 45 of Fig. 4.

Let us assume that the sliding contacts 19 and 41 are in the position shown in Fig. 1, namely in a position where they divide resistors 21 and 35 into two equal halves. When the alternating signal applied at terminal 9 is negative with respect to its reference axis, the path of the signal will be through one half of resistor 21, diodes 27 and 37, and one-half of resistor 35 to ground. When the signal is positive with respect to its reference axis, the path of the signal will be through one-half of resistor 21, diodes 29 and 31, and one-half of resistor 35 to ground. Looking again upon the gamma control network 11 as a voltage divider, it will be seen that the potential at the output terminal 13 will represent 50% of the signal applied at terminal 9, whether the signal is positive or negative. The applied signal will thus not be distorted by going through the gamma control network 11. This result is shown by curve 47 of Fig. 4.

When the impedances of diodes 27, 29, 31, and 37 are equal, and the values of resistors 21 and 35 are equal, and the sliding contacts 19 and 41 are ganged together, the compression of the signal in one direction will be the same as its expansion in the other direction. Thus the peak to peak output potential of the gamma control network 11 will remain constant regardless of the position of the ganged sliding contacts 19 and 41.

When using the gamma control network in television apparatus, it is desirable to feed into it the picture signal only, as the "grey" axis of the signal would be shifted if the synchronizing pulses were present in the input signal.

The gamma control network 11 may be used wherever gamma correction is desired. In a television system it may be used in a transmitter, in a receiver, or in transmission cables.

The controls may be made manually adjustable, or they may be preset.

Figure 4:
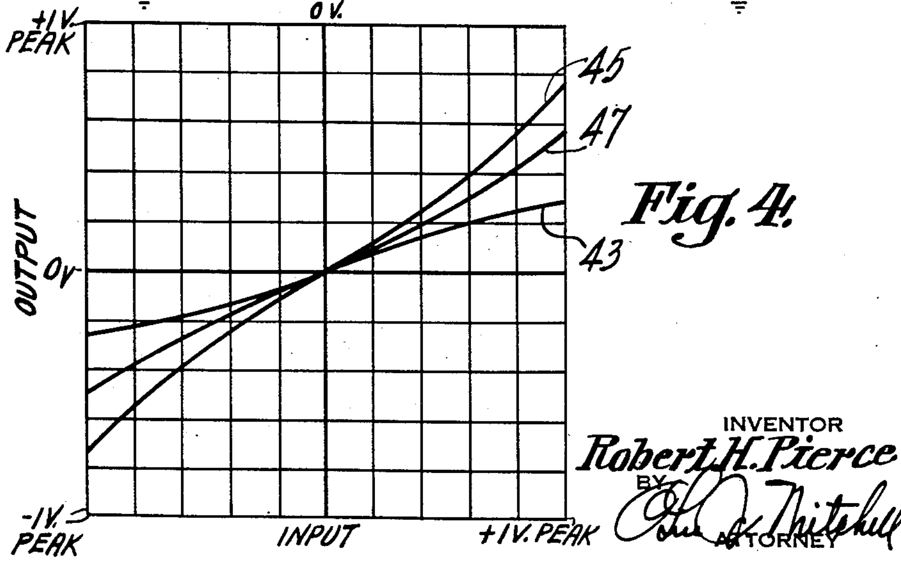
Fig. 4 is a graph showing the transfer characteristics of the circuit according to the invention.

The experimental evidence shown by the curves of Fig. 4 was obtained by using a differentiated square wave fed through a coaxial cable to a 75 ohm terminating resistor. The peak to peak measurement of the positive and negative amplitudes of the output signal were used to plot the curves. The diodes used were IN34 crystals, resistors 21 and 35 had a value of 1000 ohms, and the nominal output impedance was 350 ohms. The response of the gamma control network was flat over a range from 100 kilocycles to 10 megacycles. With the input signal having a peak to peak amplitude of two volts, a three to one ratio between expansion and compression was obtained.

I claim:

1. An electrical control circuit comprising four conduction devices each having a direction of greater conductivity, means connecting said four conduction devices to a common point in such a way that the directions of greater conductivity of a first and a second of said conduction devices are towards said common point and that the directions of greater conductivity of a third and a fourth of said conduction devices are away from said common point, an impedance connected between the terminal of said first and third conduction devices not connected to said common point, an impedance connected between the terminal of said second and fourth conduction devices not connected to said common point, a signal input circuit located between two points on each of said impedances, and a signal output circuit located between said common point and one of said points on said impedances.

2. An electrical control circuit comprising four unilateral conduction devices each having an anode and a cathode, an electrical connection common to the anodes of a first and a second of said unilateral conduction devices, said electrical connection also being common to the cathodes of a third and a fourth of said unilateral conduction devices, a first impedance connected between the cathode of said first unilateral conduction device and the anode of said third unilateral conduction device, a second impedance connected between the cathode of said second unilateral conduction device and the anode of said fourth unilateral conduction device, an input terminal located on said first impedance, another input terminal located on said second impedance, an output terminal located at one of said input terminals, and another output terminal located at said common electrical connection.

3. An electrical control circuit comprising four conduction devices each having a direction of greater conductivity, means connecting said four conduction devices to a common point in such a way that the directions of greater conductivity of a first and a second of said conduction devices are towards said common point and that the directions of greater conductivity of a third and a fourth of said conduction devices are away from said common point, a resistance connected between the unconnected terminals of said first and third conduction devices, a resistance connected between the unconnected terminals of said second and fourth conduction devices, an input terminal located on one of said resistances, an output terminal located at said common point, and a connection to ground located on another of said resistances.

4. An electrical control circuit comprising four conduction devices each having a direction of greater conductivity, means connecting said four conduction devices to a common point in such a way that the directions of greater conductivity of a first and a second of said conduction devices are towards said common point and that the directions of greater conductivity of a third and a fourth of said conduction devices are away from said common point, a first potentiometer having two fixed and one variable terminals, means connecting the fixed terminals of said first potentiometer to said first and third conduction devices, a second potentiometer having two fixed and one variable terminals, means connecting the fixed terminals of said second potentiometers and said common point being signal outvices, the variable terminal of said first and second potentiometers being signal input terminals and the variable terminal of one of said potentiometer and said common point being signal output terminals.

5. An electrical control circuit according to claim 4 wherein the variable terminals of said first and second potentiometer are ganged.

6. An electrical control circuit comprising four diodes each having an anode and a cathode, an electrical connection common to the anodes of a first and a second of said diodes and to the cathodes of a third and a fourth of said diodes, an impedance connected between the cathode of said first diode and the anode of said third diode, another impedance connected between the cathode of said second diode and the anode of said fourth diode, means to apply signals between a common point and an input terminal located on said impedance connected between the cathode of said first diode and the anode of said third diode, and an output circuit located between said common electrical connection and said common point.

ROBERT H. PIERCE.

References Cited in the file of this patent

UNITED STATES PATENTS

| Number | Name | Date |
|---|---|---|
| 2,240,289 | Dillenburger et al. | Apr. 29, 1941 |
| 2,486,068 | Shishini et al. | Oct. 25, 1949 |
| 2,580,052 | Torre et al. | Dec. 25, 1951 |